United States Patent [19]

Palmer et al.

[11] Patent Number: 4,682,804
[45] Date of Patent: Jul. 28, 1987

[54] RELEASABLE COUPLING ASSEMBLY

[75] Inventors: William B. Palmer, Palos Verdes Estates; Henry Fink, Torrance, both of Calif.

[73] Assignee: TRW Inc., Redondo Beach, Calif.

[21] Appl. No.: 603,042

[22] Filed: Apr. 23, 1984

[51] Int. Cl.⁴ .......................... B64D 1/12; B66C 1/28
[52] U.S. Cl. ................... 294/82.26; 244/161; 244/137.4; 294/82.3; 294/82.32
[58] Field of Search .................. 294/82.24–82.27, 294/82.29–82.33, 88; 24/648; 89/1.51, 1.58, 1.59; 244/137 A, 161; 410/79

[56] References Cited

U.S. PATENT DOCUMENTS

| | | |
|---|---|---|
| 2,918,324 | 12/1959 | Murphy. |
| 3,003,376 | 11/1961 | Brunow et al. |
| 3,057,652 | 10/1962 | Geffner et al. |
| 3,242,808 | 3/1966 | Nelson et al. |
| 3,266,834 | 8/1966 | Lebovitz. |
| 3,273,459 | 9/1966 | Lardin. |
| 3,503,576 | 3/1970 | Savarieau ............... 244/137 A |
| 3,559,927 | 2/1971 | Backken. |
| 3,600,031 | 8/1971 | Coleman et al. ......... 294/82.32 X |
| 3,610,094 | 10/1971 | Craigie. |
| 3,661,416 | 5/1972 | Burarkin et al. |
| 3,666,216 | 5/1972 | Nagy et al. ............. 294/82.32 X |
| 3,722,944 | 3/1973 | Dand. |
| 3,877,343 | 4/1975 | Newell et al. |
| 4,008,645 | 2/1977 | Herbert. |
| 4,173,366 | 11/1979 | Mattei et al. ............ 294/82.26 |
| 4,249,799 | 2/1981 | Iglesias. |
| 4,258,888 | 3/1981 | Sawn. |

FOREIGN PATENT DOCUMENTS

| 2359197 | 6/1975 | Fed. Rep. of Germany ..... 294/82.3 |
|---|---|---|
| 2430356 | 3/1980 | France ........................... 294/82.25 |

Primary Examiner—Johnny D. Cherry
Attorney, Agent, or Firm—Noel F. Heal

[57] ABSTRACT

A releasable coupling assembly is provided for secure retention and controlled reliable release of a releasable structure with respect to a base structure, such as a releasable spacecraft with respect to a mother spacecraft or launch vehicle. The releasable coupling assembly comprises a latch housing on the base structure and supporting a pair of pivotal latches for locking engagement with oppositely projecting locking tabs of a pawl rotatably supported on a locking shaft mounted on the releasable structure. The two latches are respectively coupled to a pair of control pistons movably disposed within cylinders in the latching housing and biased by springs toward normal positions in locked engagement with the pawl. Supply of a fluid under pressure to the cylinders displaces the control pistons in directions retracting the latches to release positions disengaged from the pawl thereby releasing the locking shaft and the releasable structure from the base structure. In the event one of the latches fails to move to the release position, the pawl is free to rotate with respect to the locking shaft for disengagement from the failed latch.

17 Claims, 6 Drawing Figures

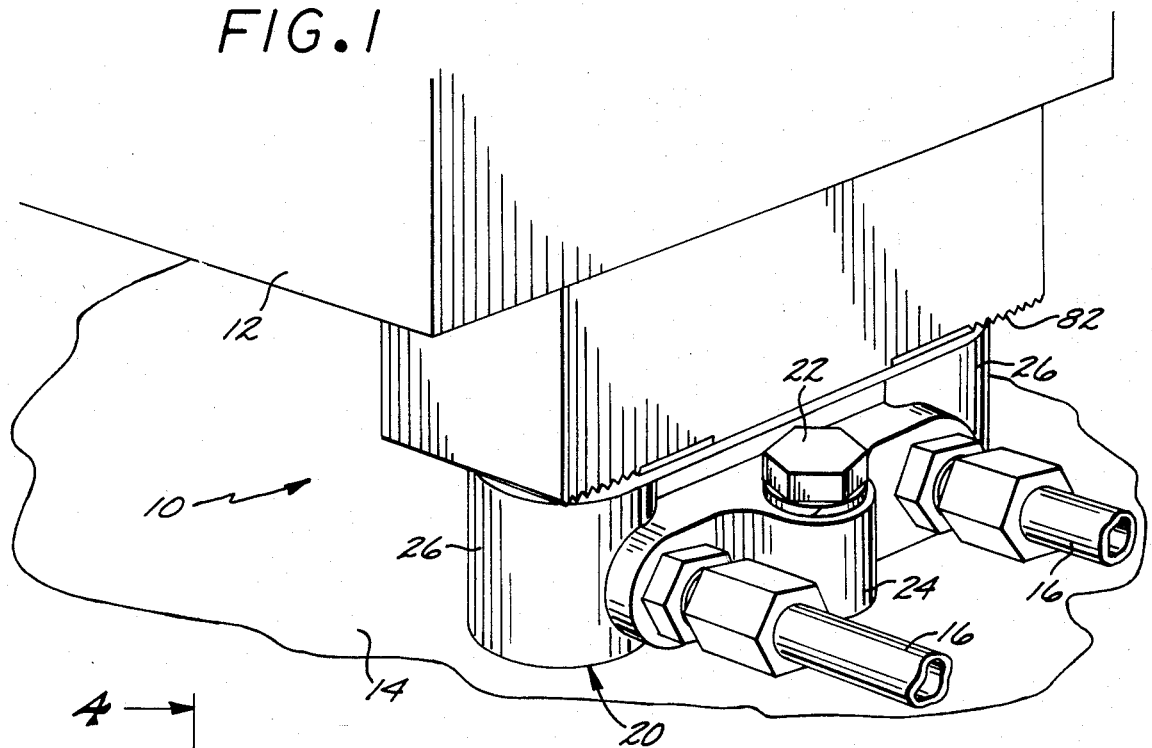
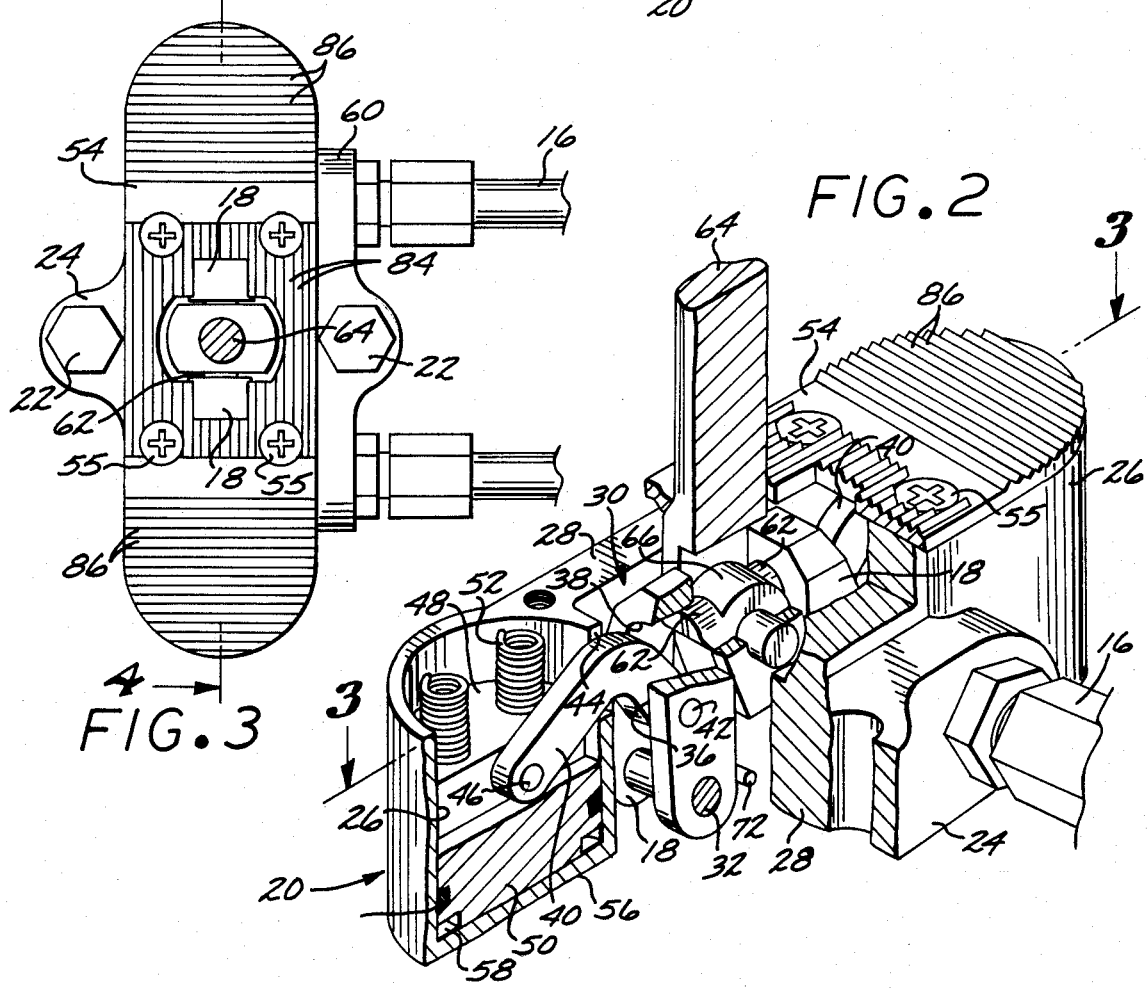
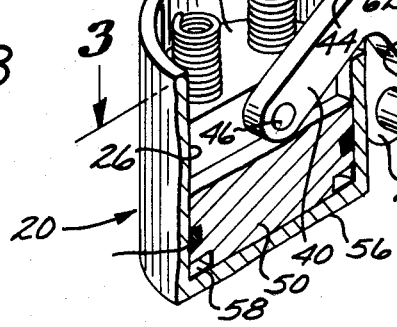

RELEASABLE COUPLING ASSEMBLY

The U.S. Government has rights in this invention.

This invention relates generally to devices for releasable mechanical coupling of two structures with respect to each other. More specifically, this invention relates to an improved and relatively compact releasable coupling assembly designed for secure locked retention and substantially fail-safe remote release of a releasable structure with respect to a base structure.

Mechanical coupling assemblies designed for remote control actuation are known for use in releasably locking a releasable structure with respect to a base structure. Such coupling assemblies have typically comprised multiple latch components movable between normal latched or locked positions securely retaining the releasable structure in place and release positions permitting separation of the releasable structure. In many operating environments, displacement of the latch components occurs in response to supply of a pressurized fluid to the coupling assembly wherein pressurized fluid supply is controlled by a valve or other appropriate means adapted for remote control actuation. For example, such fluid-actuated coupling assemblies have been used for releasable mounting of munitions and the like onto aircraft. More recently, such coupling assemblies have been used for controlled remote release of a spacecraft or other hardware from a mother spacecraft, a launch vehicle, or the like. Typical fluid pressure sources have included, for example, a liquid under pressure from an hydraulic power system or the like or a pressurized gas from a pneumatic system or derived from a pyrotechnic device.

In previous fluid-actuated coupling assemblies, proper operation of all of the multiple latch components has been a prerequisite before the releasable structure can be separated from the base structure; a failure of one of the latch components to move to its release position has prevented releasable structure separation. This limitation upon coupling assembly operation has generally been due to use of a single fluid pressure-responsive actuator device coupled to the various latch components by a relatively complex mechanical linkage, wherein any operational failure of the actuator device or any portion of the linkage results in nonseparation of the releasable structure. While this type of coupling assembly operation may be desirable in some environments for safety purposes, such as releasable mounting of munitions on aircraft, it can be highly undesirable in other operating environments, such as a spacecraft environment wherein the coupling assembly can be extremely difficult or impossible to access in the event of failed separation of the releasable structure. Previous coupling assemblies have not provided satisfactory redundant release means for insuring separation of the releasable structure in the event of partial coupling assembly malfunction.

There exists, therefore, a significant need for an improved releasable coupling assembly of the fluid-actuated type designed for secure locked retention of a releasable structure and including substantially fail-safe redundant release means for reliable separation of the releasable structure from a base structure. The present invention fulfills these needs and provides further related advantages.

SUMMARY OF THE INVENTION

In accordance with the invention, an improved fluid-actuated releasable coupling assembly is provided for securely locking a releasable structure onto a base structure and for controlled, redundant separation of the releasable structure from the base structure. The coupling assembly comprises a pair of latches pivotally mounted on a latch housing which is in turn mounted onto the base structure. The latches are normally positioned in locking engagement with oppositely projecting locking tabs of a single pawl supported for rotation within a locking shaft mounted on the releasable structure. The two latches are remotely actuatable for independent retraction to release positions disengaged from the pawl thereby permitting separation of the releasable structure. In the event one of the latches fails to disengage from the pawl, the pawl may rotate relative to the still-engaged latch to separate the associated locking tab therefrom for releasable structure separation from the base structure.

In one preferred form of the invention, the two latches are pivotally supported in spaced relation within an outwardly open latch chamber in the latch housing. A pair of connector links respectively couple the two latches to a pair of control pistons reciprocal within cylinders formed in the latch housing and biased by springs toward positions retaining the latches in their normal positions for respective locking engagement with the tabs on the pawl. Fluid pressure ports at one side of the latch housing are provided for guiding a fluid under pressure from redundant sources to the housing cylinders for displacing the control pistons in directions retracting the latches toward their release positions.

The releasable structure carries the locking shaft to project outwardly therefrom for engagement with the pivoting latches, wherein this locking shaft preferably is supported within a compact shaft housing and is biased by a spring for axial movement toward a disengaged position recessed into a cavity in the shaft housing. The outboard end of the locking shaft terminates in a yoke within which the pawl is rotatably supported in a position with the tabs thereon projecting in opposite directions for locking engagement with the pivoting latches within the latch housing.

The coupling assembly is engaged by inserting the outboard end of the locking shaft into the latch chamber between the two pivoting latches. During such insertion, the pawl is rotated to orient toward a position with the tabs thereon projecting somewhat in-line with the locking shaft to facilitate pawl movement between the closed latches. Pins within the latch chamber bear against curved lower faces of the pawl tabs to orient said pawl for proper locked engagement with the latches. When the pawl is engaged, mating serrated surfaces on the latch housing and the shaft housing secure the releasable structure with respect to the base structure in a position fixed against displacement in response to shear forces.

Supply of a fluid under pressure to the cylinders in the latch housing displaces the control pistons in directions retracting the associated latches to their release positions. Such latch movement disengages the two latches from the pawl thereby permitting the spring-loaded locking shaft to retract from the latch chamber and further permitting the releasable structure to separate from the base structure. In the event, however, one of the latches fails to disengage from the pawl, the retracting spring force on the locking shaft urges the pawl to rotate within the shaft yoke to swing the still-engaged pawl tab free from the failed latch thereby permitting releasable structure separation.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view illustrating a releasable structure retained in locked relation with respect to a base structure by use of a releasable coupling assembly embodying the novel features of the invention;

FIG. 2 is an enlarged fragmented perspective view of the coupling assembly, with portions broken away to illustrate construction details thereof;

FIG. 3 is a plan view of a portion of the coupling assembly taken generally on the line 3—3 of FIG. 2;

DETAILED DESCRIPTION OF THE PREFERRED EMBODIMENT

Figure 4:
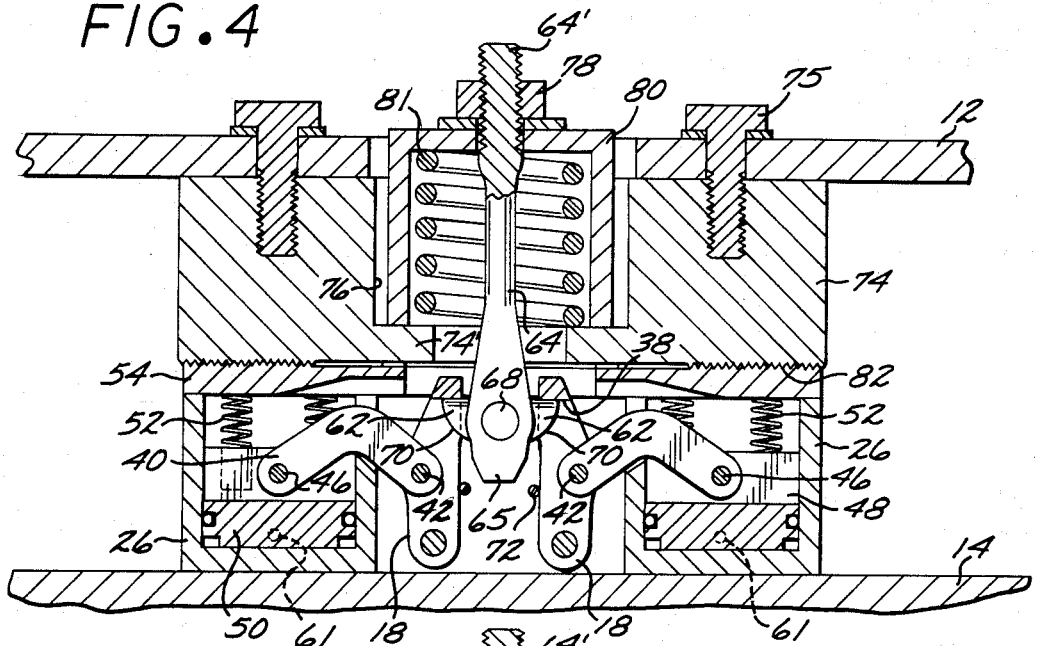
FIG. 4 is a fragmented transverse section taken generally on the line 4—4 of FIG. 3 and depicting the coupling assembly in a locked condition.

As shown in the exemplary drawings, a releasable coupling assembly referred to generally by the reference numeral 10 is provided for secure locked retention of a releasable structure 12 with respect to a base structure 14. The coupling assembly 10 is adapted for remote control actuation in response to supply of a fluid under pressure through conduits 16 (FIG. 1) for controlled and reliable independent operation of a pair of latches 18 (FIG. 2) to permit separation of the releasable structure 12 from the base structure 14.

The releasable coupling assembly 10 of the present invention advantageously provides a compact and relatively simple unit for secure mechanical coupling of a variety of structures, wherein the coupling assembly is adapted for substantially fail-safe fluid pressure actuation particularly by remote control means for reliable structure separation. For example, the coupling assembly 10 is particularly adapted for use in an aircraft or spacecraft environment to securely retain virtually any releasable or jettisonable structure with respect to an aircraft, spacecraft, launch vehicle, or the like. The couplng assembly is advantageously compact and lightweight while securely and positively locking the releasable structure in palce with high mechanical advantage. When releasable structure separation is desired, however, the coupling assembly is conveniently actuated by remote control supply of a fluid under pressure from any convenient and preferably redundant source to insure substantially fail-safe structure separation. In this regard, the coupling assembly is designed for releasable structure separation notwithstanding partial malfunction of the coupling assembly, thereby rendering the invention particularly desirable in spacecraft or other environments wherein human access to the coupling assembly might be extremely difficult or impossible.

As shown in one preferred form in FIGS. 1–6, the releasable coupling assembly 10 comprises a relatively compact latch housing 20 which may be formed from virtually any convenient material by a casting or machining process wherein the housing material is chosen to withstand the particular intended operating environment for the coupling assembly. This latch housing 20 is securely mounted onto the base structure 14 by a pair of mounting bolts 22 passed through appropriate openings in bolt bosses 24 formed on opposite sides of the latch housing. In the illustrative embodiment, these mounting bolts 22 are shown secured into the base structure 14 to position the latch housing 20 on an exterior or skin surface of the base structure. Alternatively, if desired, the latch housing 20 can be securely mounted within an outwardly open recess in the base structure 14 to avoid protruding components. Still further, the latch housing 20 can be installed onto the releasable structure 12, if desired.

The latch housing 20 is shaped to include a pair of generally identical cylinders 26 in spaced relation to each other and having opposite sides interconnected by an integrally formed pair of sidewalls 28 spanning the distance between the cylinders 26. These sidewalls 28 cooperate with facing portions of the cylinders 26 to define an outwardly presented open latch chamber 30 within which the two latches 18 are mounted.

More specifically, the two latches 18 comprises a pair of generally identical, somewhat elongated mechanical links of inverted, generally U-shaped configuration with lower ends pivotally supported in spaced relation within the latch chamber 30 on a respective pair of generally parallel pivot pins 32 extending between and supported by the sidewalls 28 of the latch housing 20. From their respective pivot pins 32, each of the latches 18 extends upwardly (as viewed in FIG. 2) with a sufficient width defining a central, generally vertically elongated slot 36 formed to extend from the lower end of the latch upwardly to terminate in a downwardly presented locking surface 38 formed near the latch upper end.

A pair of curved connector links 40 are associated respectively with the latches 18 to control pivoting latch movement between normal or locked positions with the upper ends of the latches pivoted toward each other and retracted release positions with said latch upper ends pivoted away from each other. These connector links 40 each have one end extending into a middle portion of the slot 36 in the associated latch 18 and pivotally connected to the latch by a short latch pin 42 carried by the latch to extend through said slot 36. From the latches 18, the connector links project away from each other and into the respective cylinders 26 through aligned cylinder openings 44. The opposite ends of the connector links are pivotally secured by pins 46 respectively to the head 48 of a control piston 50 carried for reciprocal movement within the associated cylinder 26. Springs 52 react compressively between the cylinder head portions 48 and a housing faceplate 54 fastened onto the latch housing 20 by screws 55 or the like to close the upper ends of the cylinders 26.

The compression springs 52 apply a downwardly directed spring force to the control pistons 50 thereby urging the control pistons toward normal positions resting upon baseplates 56 closing the lower ends of the cylinders 26. In these positions, as shown best in FIGS.

2 and 4, lower grooved peripheries of the pistons 50 respectively define a pair of lower annular pressure chambers 58 within the cylinders 26. Fluid under pressure is controllably supplied to these pressure chambers 58 via the conduits 16 which are coupled to the latch housing 20 in flow communication with appropriate internal flow ports 61 (FIG. 4) for independently coupling of fluid from the conduits 16 to the respective cylinders 26. Supply of fluid under pressure to the chambers 58 urges the control pistons 50 to displace upwardly within the cylinders 26, with peripheral seal rings 63 being conveniently provided about the pistons above the pressure chambers 58 to prevent significant fluid leakage around the pistons.

The latches 18 within the open latch chamber 30 of the latch housing 20 are thus normally supported by the spring-loaded control pistons 50 in generally vertical and generally parallel locked positions (FIG. 4), as will be described in more detail. In these locked positions, the axes of the pivot pins 42 and 46 associated with the connector links 40 are generally aligned in a common plane oriented substantially perpendicular to the latches 18, as viewed in FIG. 4. As a result, external forces applied to the latches 18 and tending to separate the latches are generally ineffective to retract the latches away from each other toward their release positions. Alternatively stated, the latches 18 are retained in their locked positions with a high mechanical advantage, thereby permitting high locking forces in a compact coupling assembly. Supply of fluid under pressure to the annular chambers 58 beneath the control pistons 50, however, displaces the pistons within the chambers 26 and correspondingly moves the connecting link pivot axes out of coplanar alignment (FIG. 5) progressively toward positions of decreasing mechanical advantage to facilitate disengagement and separation of the releasable structure 12.

The latches 18 lockingly engage a pawl 66 supported from the releasable structure 12. More specifically, the releasable structure 12 carries a locking shaft 64 having a yoke 65 at an outboard end within which the pawl 66 is rotatably supported on trunnions 68 for rotation about an axis generally in parallel with the latch pivot pins 32. This pawl 66 includes integrally-formed tabs 62 projecting outwardly in opposite directions from the locking shaft 66 generally at a right angle to the trunnion axis for locking reception into the latch slots 36 in bearing engagement with the locking surfaces 38 at the upper extents thereof. Conveniently, the pawl tabs 62 each have an outwardly and downwardly curved convex lower face 70 shaped to facilitate initial insertion of the pawl 66 downwardly between and past the closed latches 18 with the pawl 66 rotated on the locking shaft 64 to orient the tabs 62 in a nearly vertical arrangement within the limits of the shaft yoke 65. During such initial insertion, when the tabs 62 clear the latches 18, the lower one of the tabs 62 contacts one of a pair of lower limit pins 72 mounted to extend transversely across the latch chamber 30 to prevent pawl overinsertion and to rotate the pawl to orient the tabs 62 in positions for respective locked engagement by the latches 18. Such engagement is shown best in FIG. 4 which depicts upper surfaces of the pawl tabs in bearing engagement with the locking surfaces 38 within the latch slots 36.

As shown in one preferred form in FIG. 4, the locking shaft 64 is preferably supported within a shaft housing 74 which may be formed from any suitable material and is secured onto the releasable structure 12 by bolts 75 or the like. This shaft housing 74 includes a central cavity 76 into which the locking shaft 64 projects for threaded engagement of its inboard end 64' with a stop nut 78. A downwardly open reaction cup 80 is interposed between this stop nut 78 and a shoulder 74' on the shaft housing 74, and a compression spring 81 reacts between the shoulder 74' and the base of the cup 80 to urge the locking shaft 64 toward a normal position retracted into the shaft housing cavity 76. An outwardly presented faceplate 82 on the shaft housing 74 is appropriately serrated for mating locked engagement with outwardly presented longitudinal and transverse serrations 84 and 86 on the latch housing faceplate 54 to lock the releasable structure 12 against displacement relative to the base structure 14 in response to shear forces when the pawl 66 on the locking shaft 64 is in locked engagement with the latches 18.

Figure 5:
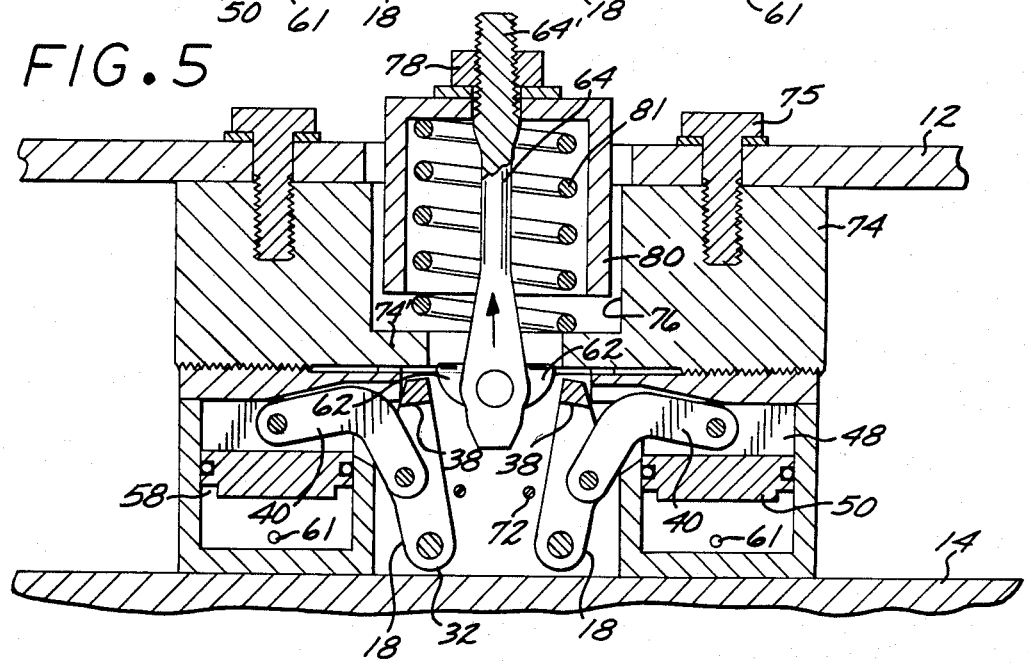
FIG. 5 is a fragmented transverse section generally similar to FIG. 4 and illustrating the coupling assembly in a released condition.
Figure 6:
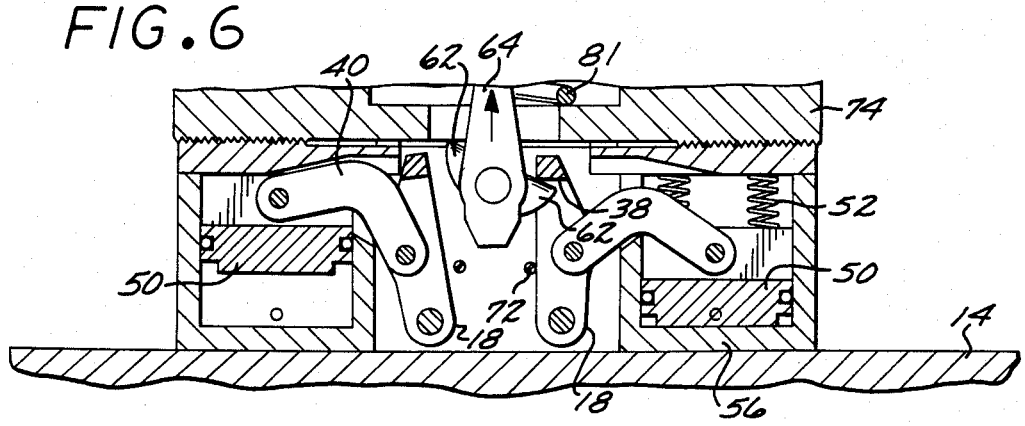
FIG. 6 is a fragmented transverse section generally similar to FIG. 4 and illustrating the coupling assembly in a partially failed release condition.

When it is desired to separate the releasable structure 12 from the base structure 14, fluid under pressure is independently supplied through the conduits 16 to the cylinders 26 of the latch housing 20 for independently retracting the latches 18 toward their release positions with upper ends pivoted away from each other, as viewed in FIG. 5. The pressurized fluid may be obtained from any convenient source, such as an hydraulic or pneumatic fluid shared with an appropriate hydraulic or pneumatic system of the base structure, or the source may constitute expanding gas from an exploded pyrotechnic device or the like. In any case, however, the fluid source is advantageously a redundant source or sources preferably adapted for remote control actuation by appropriate valve or signal means or the like (not shown).

Retraction movement of the latches 18 disengages the latch locking surfaces 38 from the oppositely projecting pawl tabs 62 thereby permitting the compression spring 81 to withdraw the locking shaft 64 to a disengaged position into the associated housing cavity 76. When this occurs, the releasable structure 12 is disengaged from the base structure 14 and may thus be separated therefrom manually or by other propulsion means.

In accordance with one important aspect of the present invention, the coupling assembly 10 reliably releases the releasable structure 12 notwithstanding a failure of one of the latches 18 to move to the retracted position in response to fluid pressure supply. More particularly, with reference to FIG. 6, retraction of one but not both of the latches 18 results in disengagement of one of the pawl tabs 62. When this occurs, the spring 81 in the shaft housing 74 withdraws the locking shaft 64 in an upward direction into the housing cavity 76. Such shaft withdrawal forces the pawl 66 to rotate about the axis of its trunnion 68 thereby freeing the still-engaged pawl tab 62 from beneath the associated latch 18. In this manner, in spite of failure or malfunction of one of the latches, the releasable structure 12 is still released and may be separated from the base structure 14.

The releasable coupling assembly 10 of the present invention thus provides a compact unit for securely locking a releasable structure in place with high coupling forces. However, when releasable structure separation is desired, the coupling assembly provides substantially fail-safe release means for reliable remote control actuated release notwithstanding partial unit malfunction.

A variety of modifications and improvements to the invention described herein are believed to be apparent to those skilled in the art. Accordingly, no limitation on the invention is intended, except by way of the appended claims.

What is claimed is:

1. A releasable coupling assembly for controlled retention and release of a releasable structure with respect to a base structure, comprising:
   a pair of latches mounted with respect to the base structure in spaced relation and for pivoting movement about generally parallel axes;
   a locking shaft mounted with respect to the releasable structure and having an outboard end for projection from the releasable structure to a position generally between said latches;
   a pawl mounted generally at the outboard end of said locking shaft for rotation about an axis generally in parallel with the rotational axes of said latches, said pawl supporting a pair of tabs projecting generally in opposite directions for respective locking engagement with said latches when the shaft outboard end is positioned generally therebetween;
   means for normally retaining said latches in locked positions for locked engagement with said tabs and for moving said latches to unlocked positions disengaged from said tabs; and
   means for biasing said locking shaft toward a normal position with the outboard end thereof retracted from a position generally between said latches, thereby urging said pawl to rotate when only one of said latches is moved to the unlocked position, the rotation of said pawl disengaging the remaining engaged tab and allowing the releasable structure to separate from the base structure.

2. The releasable coupling assembly of claim 1 wherein said locking shaft biasing means comprises a spring reacting between said locking shaft and the releasable structure.

3. The releasable coupling assembly of claim 1 wherein the outboard end of said locking shaft includes a yoke, said pawl being rotatably received within said yoke.

4. The releasable coupling assembly of claim 1 wherein said latch retaining and moving means comprises a pair of spring-loaded control pistons movably received within a respective pair of cylinders and respectively coupled to said latches, said control pistons being normally biased toward positions retaining said latches in said locked positions, and including means for independently supplying a fluid under pressure to each of said cylinders for displacing said pistons to move said latches to said unlocked positions.

5. The releasable coupling assembly of claim 4 including a latch housing, said cylinders being formed generally in spaced relation within said latch housing and said latches being pivotally supported by said latch housing in an outwardly open latch chamber formed generally between said cylinders.

6. The releasable coupling assembly of claim 4 including a pair of connector links respectively pivotally interconnecting said latches with said control pistons, said connector links being pivotal about axes oriented generally in a common plane when said latches are in locked positions.

7. The releasable coupling assembly of claim 6 wherein said latches are oriented generally in parallel with each other and generally perpendicular to said plane including the pivot axes of said connector links when said latches are in the locked positions.

8. The releasable coupling assembly of claim 1 wherein said tabs each include a generally convexly curved face presented in a generally outward direction relative to said pawl and relative to the releasable structure.

9. A releasable coupling assembly for controlled retention and release of a releasable structure with respect to a base structure, comprising:
   a pair of latches mounted with respect to the base structure in spaced relation and for pivoting movement about generally parallel axes;
   a locking shaft mounted with respect to the releasable structure and having an outboard end for projection from the releasable structure to a position generally between said latches;
   a pawl mounted generally at the outboard end of said locking shaft for rotation about an axis generally in parallel with the rotational axes of said latches, said pawl supporting a pair of tabs projecting generally in opposite directions for respective locking engagement with said latches when the shaft outboard end is positioned generally therebetween;
   means for normally retaining said latches in locked positions for locked engagement with said tabs and for moving said latches to unlocked positions disengaged from said tabs, said latch retaining and moving means including a pair of spring-loaded control pistons movably received within a respective pair of cylinders and respectively coupled to said latches, said control pistons being normally biased toward positions retaining said latches in said locked positions, and including means for supplying a fluid under pressure to said cylinders for displacing said pistons to move said latches to said unlocked positions;
   means for biasing said locking shaft toward a normal position with the outboard end thereof retracted from a position generally between said latches; and
   a latch housing, said cylinders being formed generally in spaced relation within said latch housing and said latches being pivotally supported by said latch housing in an outwardly open latch chamber formed generally between said cylinders, said latch chamber including a pair of limit pins for contacting said tabs to rotate said pawl relative to said shaft for orienting said tabs for locking engagement with said latches.

10. A releasable coupling assembly for controlled retention and release of a releasable structure with respect to a base structure, comprising:
    a pair of latches mounted with respect to the base structure in spaced relation and for pivoting movement about generally parallel axes;
    a locking shaft mounted with respect to the releasable structure and having an outboard end for projection from the releasable structure to a position generally between said latches;
    a pawl mounted generally at the outboard end of said locking shaft for rotation about an axis generally in parallel with the rotational axes of said latches, said pawl supporting a pair of tabs projecting generally in opposite directions for respective locking engagement with said latches when the shaft outboard end is positioned generally therebetween;
    means for normally retaining said latches in locked positions for locked engagement with said tabs and for moving said latches to unlocked positions disengaged from said tabs, said latch retaining and moving means including a pair of spring-loaded control pistons movably received within a respective pair of cylinders and respectively coupled to said latches, said control pistons being normally biased toward positions retaining said latches in said locked positions, and including means for supplying a fluid under pressure to said cylinders for displacing said pistons to move said latches to said unlocked positions;

means for biasing said locking shaft toward a normal position with the outboard end thereof retracted from a position generally between said latches; and a latch housing, said cylinders being formed generally in spaced relation within said latch housing and said latches being pivotally supported by said latch housing in an outwardly open latch chamber formed generally between said cylinders;

wherein said pawl is supported within a shaft housing on the releasable structure, said latch and shaft housings having outwardly presented mating discontinuous surfaces engageable when said tabs are lockingly engaged by said latch for preventing relative movement between the releasable and base structures in response to shear forces when said surfaces are matingly engaged.

11. A releasable coupling assembly for controlled retention and release of a releasable structure with respect to a base structure, comprising:

a pair of latches mounted with respect to one of the releasable and base structures in spaced relation and for pivoting movement about generally parallel axes;

a locking shaft mounted with respect to the other of the releasable and base structures and having an outboard end for projection to a position generally between said latches;

a pawl mounted generally at the outboard end of said locking shaft for rotation about an axis generally in parallel with the rotational axes of said latches, said pawl supporting a pair of tabs projecting generally in opposite directions for respective locking engagement with said latches when the shaft outboard end is positioned generally therebetween;

means for normally retaining said latches in locked positions for locked engagement with said tabs and for moving said latches to unlocked positions disengaged from said tabs; and means for biasing said locking shaft toward a normal position with the outboard end thereof retracted from a position generally between said latches, thereby urging said pawl to rotate when only one of said latches is moved to the unlocked position, the rotation of said pawl disengaging the remaining engaged tab and allowing the releasable and base structures to separate.

12. The releasable coupling assembly of claim 11 wherein said latch retaining and moving means comprises a pair of spring-loaded control pistons movably received within a respective pair of cylinders and respectively coupled to said latches, said control pistons being normally biased toward positions retaining said latches in said locked positions, and including means for independently supplying a fluid under pressure to each of said cylinders for displacing said pistons to move said latches to said unlocked positions.

13. The releasable coupling assembly of claim 12 including a pair of connector links respectively pivotally interconnecting said latches with said control pistons, said connector links being pivotal about axes oriented generally in a common plane when said latches are in the locked positions, said latches being oriented generally in parallel with each other and generally perpendicular to said plane including the pivot axes of said connector links when said latches are in the locked positions.

14. A releasable coupling assembly for controlled retention and release of a releasable structure with respect to a base structure, comprising:

a latch housing for mounting on the base structure and including a pair of spaced cylinders, an outwardly open latch chamber generally between said cylinders, and means for independently supplying a fluid under pressure to each of said cylinders;

a pair of latches mounted in spaced relation within said latch chamber for pivoting movement of outwardly presented ends of said latches generally toward and away from each other about generally parallel axes, said latches each defining a generally inwardly presented locking surface;

a pair of pistons movably received respectively within said cylinders;

a pair of connector links respectively pivotally interconnected between said latches and said pistons, said connector links being pivotal about axes disposed generally in a common plane generally perpendicular to said latches when said latches are pivoted toward each other to locked positions generally in parallel with each other;

a locking shaft mounted with respect to the releasable structure and having an outboard end for projection to a position generally between said latches;

spring means for biasing said locking shaft toward a normal position when the outboard end retracted from generally between said latches; and a pawl mounted generally at the outboard end of said locking shaft for rotation about an axis generally in parallel with the rotational axes of said latches, said pawl supporting a pair of tabs projecting generally in opposite directions for respective locking engagement with said latches when the shaft outboard end is positioned generally therebetween when said latches are in the locked positions;

said pistons being movable in response to supply of the fluid under pressure to said cylinders by said fluid supply means to retract the outwardly presented end of said latches from the locked positions generally away from each other to unlocked positions disengaged from said tabs to release the releasable structure relative to the base structure;

wherein said spring means urges said pawl to rotate when only one of said latches is moved to the unlocked position, the rotation of said pawl disengaging the remaining engaged tab and allowing the releasable structure to separate from the base structure.

15. The releasable coupling assembly of claim 14 wherein said tabs each include a generally convexly curved face presented in a generally outward direction relative to said pawl and relative to the releasable structure.

16. A releasable coupling assembly for controlled retention and release of a releasable structure with respect to a base structure, comprising:

a latch housing for mounting on the base structure and including a pair of spaced cylinders, an outwardly open latch chamber generally between said cylinders, and means for independently supplying a fluid under pressure to said cylinders;

a pair of latches mounted in spaced relation within said latch chamber for pivoting movement of outwardly presented ends of said latches generally toward and away from each other about generally parallel axes, said latches each defining a generally inwardly presented locking surface;

a pair of pistons movably received respectively within said cylinders;

a pair of connector links respectively pivotally interconnected between said latches and said pistons, said connector links being pivotal about axes disposed generally in a common plane generally perpendicular to said latches when said latches are pivoted toward each other to locked positions generally in parallel with each other;

a locking shaft mounted with respect to the releasable structure and having an outboard end for projection to a position generally between said latches;

spring means for biasing said locking shaft toward a normal position with the outboard end retracted from generally between said latches;

a pawl mounted generally at the outboard end of said locking shaft for rotation about an axis generally in parallel with the rotational axes of said latches, said pawl supporting a pair of tabs projecting generally in opposite directions for respective locking engagement with said latches when the shaft outboard end is positioned generally therebetween when said latches are in the locked positions;

said pistons being movable in response to supply of the fluid under pressure to said cylinders by said fluid supply means to retract the outwardly presented end of said latches from the locked positions generally away from each other to unlocked positions disengaged from said tabs to release the releasable structure relative to the base structure; and a pair of limit pins within said latch chamber for contacting said tabs to rotate said pawl relative to said shaft for orienting said tabs for locking engagement with said latches.

17. A releasable coupling assembly for controlled retention and release of a releasable structure with respect to a base structure, comprising:

a latch housing for mounting on the base structure and including a pair of spaced cylinders, an outwardly open latch chamber generally between said cylinders, and means for independently supplying a fluid under pressure to said cylinders;

a pair of latches mounted in spaced relation within said latch chamber for pivoting movement of outwardly presented ends of said latches generally toward and away from each other about generally parallel axes, said latches each defining a generally inwardly presented locking surface;

a pair of pistons movably received respectively within said cylinders;

a pair of connector links respectively pivotally inteconnected between said latches and said pistons, said connector links being pivotal about axes disposed generally in a common plane generally perpendicular to said latches when said latches are pivoted toward each other to locked positions generally in parallel with each other;

a locking shaft mounted with respect to the releasable structure and having an outboard end for projection to a position generally between said latches;

spring means for biasing said locking shaft toward a normal position with the outboard end retracted from generally between said latches;

a pawl mounted generally at the outboard end of said locking shaft for rotation about an axis generally in parallel with the rotational axes of said latches, said pawl supporting pair of tabs projecting generally in opposite directions for respective locking engagement with said latches when the shaft outboard end is positioned generally therebetween when said latches are in the locked positions; and said pistons being movable in response to supply of the fluid under pressure to said cylinders by said fluid supply means to retract the outwardly presented end of said latches from the locked positions generally away from each other to unlocked positions disengaged from said tabs to release the releasable structure relative to the base structure;

wherein said pawl is supported within a shaft housing on the releasable structure, said latch and shaft housings having outwardly presented mating discontinuous surfaces engageable when said tabs are lockingly engaged by said latch for preventing relative movement between the releasable and base structures in response to shear forces when said surfaces are matingly engaged.

* * * * *